(No Model.) 2 Sheets—Sheet 1.
F. H. RICHARDS.
SCREW THREADING MACHINE.
No. 415,845. Patented Nov. 26, 1889.
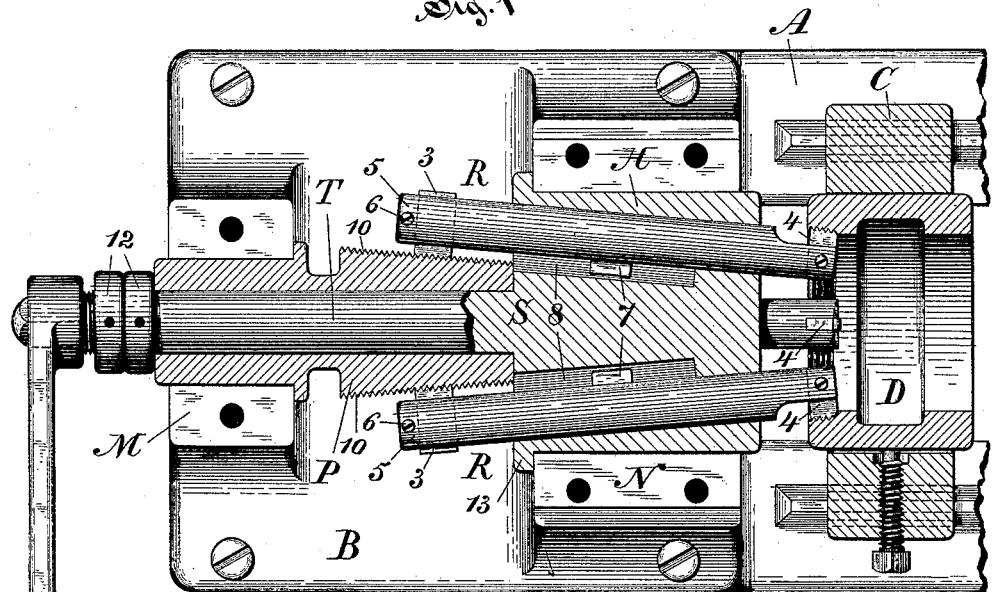
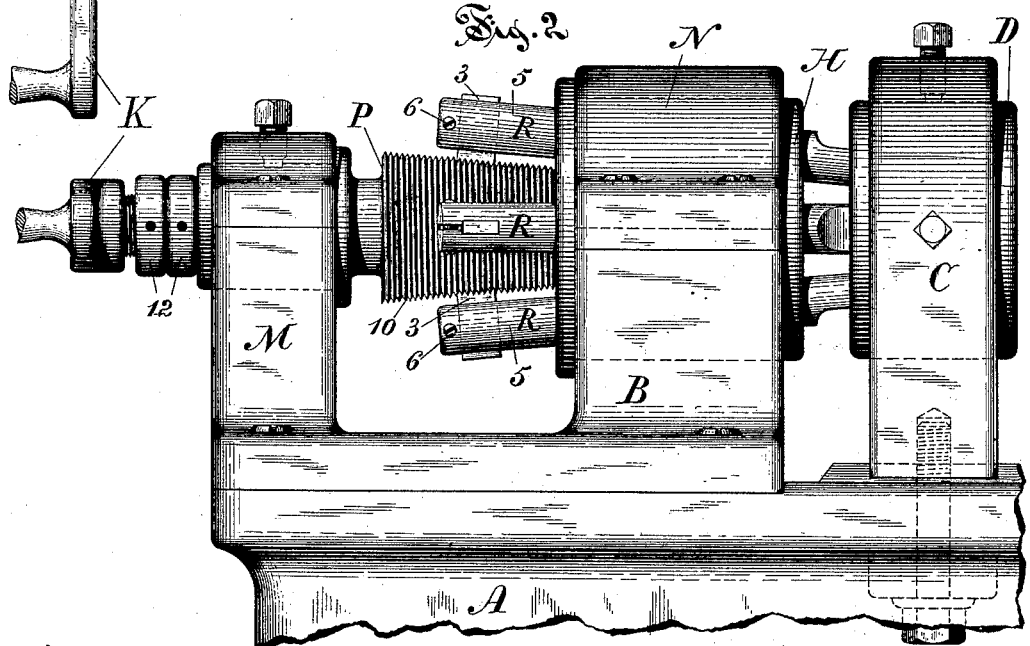
Witnesses:
W. M. Bjorkman.
Henry L. Rickard.
Inventor:
Francis H. Richards (No Model.) 2 Sheets—Sheet 2.
F. H. RICHARDS.
SCREW THREADING MACHINE.
No. 415,845. Patented Nov. 26, 1889.
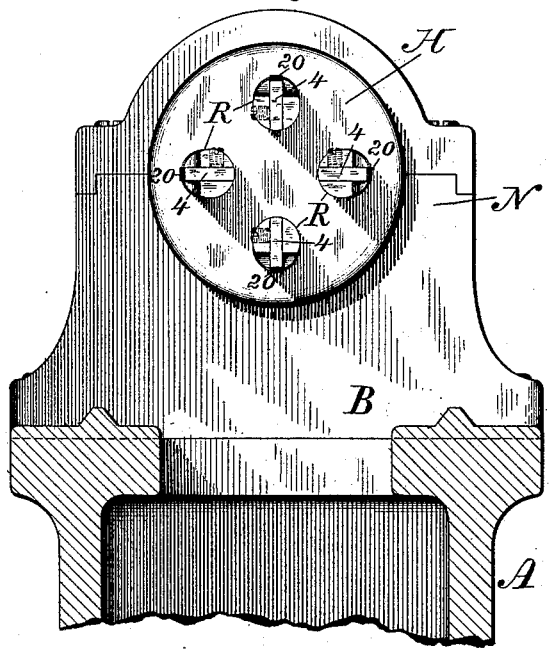
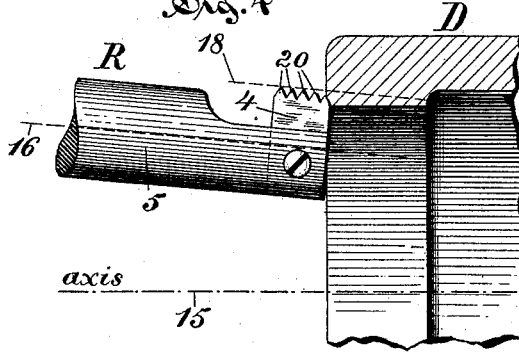
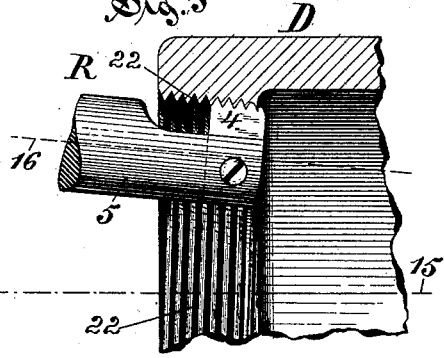
Witnesses:
W. M. Bjorkman.
Henry L. Rickard.
Inventor:
Francis H. Richards

UNITED STATES PATENT OFFICE.

FRANCIS H. RICHARDS, OF HARTFORD, CONNECTICUT.

SCREW-THREADING MACHINE.

SPECIFICATION forming part of Letters Patent No. 415,845, dated November 26, 1889.

Application filed September 27, 1888. Serial No. 286,611. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Screw-Cutting Machines, of which the following is a specification.

This machine cuts the threads of tapered screws—such as the threads of pipe-fittings and the like—by means of chasers having an advancing motion parallel to the threaded surface.

In the drawings accompanying and forming a part of this specification, Figure 1 is a plan view, partially in section, of a screw-cutting machine embodying my improvements. Fig. 2 is a front elevation of the machine. Fig. 3 is an elevation of the front end of the spindle and head-block. Figs. 4 and 5 are views illustrating the method of cutting the screw-thread.

Similar characters designate like parts in all the figures.

The bed of the machine, which is designated by A, may be of any suitable form and proportions. On this bed I place the head-block B and also the chuck C, or some other device or apparatus for holding the article D to be threaded. This article, as shown in the drawings, is supposed to be an ordinary cast-iron pipe-coupling; but a variety of other well-known articles may be properly threaded in my machine, and for the chuck C, I may use any well-known device for like purpose. The head-block may or may not be formed integral with the bed by which it is supported.

My improved machine has a revolving spindle, one or more chasers having an advancing motion at an inclination to the axis of the screw-thread being cut, and means for so advancing the chaser. The spindle consists (or may consist) of the stem T and the spindle-head H. This spindle-head carries the chasers R, and is fitted to revolve in a suitable bearing N on the head-block B. The stem T extends rearward from and furnishes the means for revolving the head H, said stem being provided with the crank K or other well-known device for such purpose.

The chaser consists of a longitudinally-sliding part provided with thread-cutting teeth, and having a guide-nut, through which motion is imparted thereto. For convenience of renewal of said nut and cutting-teeth, which are necessarily subjected to considerable wear, I preferably make said chaser of composite construction and affix the nut 3 and the thread-cutting tool 4 to the chaser stem or bar 5. This I may do as shown in the drawings, where the nut or guide-block 3 is inserted through a mortise in the bar 5, and is clamped therein by the screw 6. The cutting-tools 4, constituting the "chaser" proper, are (or may be) similarly held in place; but in the drawings these parts have the clamp-screws differently arranged, but in a well-known manner. For preventing rotation of chaser-bars 5 in head H, (when said bars are cylindrical,) I may employ the ordinary keys 7, fixed in the bars and sliding in the keyways 8, formed in said head; but bars 5 may be of other than cylindrical form and be fitted to slide in correspondingly-shaped holes in the chaser-carrying head.

For actuating the chasers to have the proper advancing movement corresponding to the pitch of the thread-cutting tools 4, I provide a pattern or guide screw, which I ordinarily arrange rearward of the head H and concentric to the axis thereof. This pattern P is conveniently made hollow and placed over the stem T, being held in place by clamping it in the bearing M of the head-block B, or otherwise, as may be preferred. When thus placed, its threaded guide-surface 10 is preferably formed conical of a taper corresponding to the inclination of the chaser movement, so that the blocks 3 may properly mesh with the said pattern-thread 10 at all times during movement of said chasers. This construction and arrangement, while constituting one part of my present invention, are not indispensable to a proper operation of the chasers, since these may be connected indirectly with an actuating pattern-thread or cam, as shown in my application, Serial No. 300,296.

For retaining the spindle in proper longitudinal position the nuts 12 may be used; also, the shoulder or flange 13 may be formed on one or both ends of the head H. As shown, the pattern P serves as a stop in a direction opposing the said nuts and flange.

The chaser-carrying head and the work-holding chuck have one of them a revolving motion relative to the other at fixed positions longitudinally of a common axis, and during such revolution the chasers have a movement longitudinally of and at an inclination to such common axis. By reason of this peculiar mode of operation the teeth of the cutting-tool or chaser follow parallel to the threaded surface after the same manner in which the teeth of the ordinary plug-top follow the threaded surface of a cylindrical bore, and by reason also of this peculiar feature tapered (or conical) holes are threaded by means of my improved machine with the same ease and economy of power as straight (or cylindrical) holes have heretofore been threaded. This will be clearly understood from Figs. 4 and 5, in which the dotted line 15 represents the common axis referred to, extending through the head H and the work (article) D to be threaded. The dotted line 16 is the line of movement inclined to the said axis of the chaser. In Fig. 4 the cutting-teeth 20 of the tool 4 stand adjacent to the coupling D to be threaded. On revolving the head H the chaser is advanced along the line 16 and the teeth 20 along the parallel line 18, and the thread 22 is chased out in accordance with the pattern P and of a taper corresponding to the inclination of line 16 to the axis 15. The thread 22 being finished, the movement of the machine is reversed and the chasers retracted to their former position. Taper threads formed by this method have the same true and smooth surface of straight threads made by well-constructed taps, and are free from the sharp edges or "nicks" left by the ordinary taper tap when it is reversed to be retracted. In using the latter kind of tool all the teeth within the hole are cutting-teeth, so that on reversing the motion a great number of "chips" or cuts are suddenly stopped and broken off, leaving the projecting edges referred to of a height equal to the thickness of the chip or cut which was being made by the several teeth, respectively. In pipe-fittings for high pressures this irregularity is inimical and especially prejudicial to fittings to be used for air and gases under pressure.

Having thus described my invention, I claim—

1. The combination, in a screw-cutting machine, of a work-holding chuck, a revolving chaser-carrying head, sliding chasers carried by said head and constructed and arranged to have a movement at an inclination to the axis of revolution of said head, and a pattern connected to slide said chasers correspondingly to the pitch of the thread-cutting tool constituting a part of the chaser, all substantially as described.

2. The combination, in a screw-cutting machine, of the revolving head, sliding chasers carried by and at an inclination to the axis of said head, said chasers being furnished with thread-cutting tools, and a pattern-screw operatively connected with said chasers by guide-nuts, substantially as described.

3. The combination, in a screw-cutting machine, of the revolving non-sliding head H, the chaser-bars carrying thread-cutting tools, the pattern-thread P, and guide-nuts removably fixed in said bars and meshing with said pattern-thread, substantially as described.

4. The combination, in a screw-cutting machine, of the revolving head H, having the driving-stem S, and bored at an inclination to its axis to receive a sliding chaser-bar, the chaser-bar sliding in said head, and the threaded pattern concentric to and surrounding said stem, and the guide-nut actuating said chaser-bar from said pattern during the rotation of said head, all substantially as described.

FRANCIS H. RICHARDS.

Witnesses:
SAMUEL W. POWEL,
HENRY L. RECKARD.